US012621793B2

(12) United States Patent
Liu et al.

(10) Patent No.: US 12,621,793 B2
(45) Date of Patent: May 5, 2026

(54) METHOD FOR DIRECT CURRENT LOCATION PROCESSING AND RELATED DEVICE

(71) Applicant: VIVO MOBILE COMMUNICATION CO., LTD., Guangdong (CN)

(72) Inventors: Xuanbing Liu, Guangdong (CN); Xiaodong Yang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 297 days.

(21) Appl. No.: 18/347,871

(22) Filed: Jul. 6, 2023

(65) Prior Publication Data

US 2023/0354260 A1     Nov. 2, 2023

Related U.S. Application Data

(63) Continuation of application No. PCT/CN2021/143668, filed on Dec. 31, 2021.

(30) Foreign Application Priority Data

Jan. 7, 2021     (CN) .......................... 202110020056.3

(51) Int. Cl.
*H04W 64/00* (2009.01)
*H04L 5/00* (2006.01)
*H04W 8/22* (2009.01)

(52) U.S. Cl.
CPC ......... *H04W 64/003* (2013.01); *H04L 5/0048* (2013.01); *H04W 8/22* (2013.01)

(58) Field of Classification Search
CPC ....... H04W 64/003; H04W 8/22; H04W 8/24; H04W 72/0453; H04W 72/21; H04W 72/23; H04W 72/0457; H04L 5/0048; H04L 5/001; Y02D 30/70
See application file for complete search history.

(56) References Cited

U.S. PATENT DOCUMENTS 11,160,055 B2 * 10/2021 Kubota ............. H04W 56/0035
2019/0313394 A1   10/2019 Kubota et al.
(Continued)

FOREIGN PATENT DOCUMENTS

CN     102448176 A     5/2012
CN     111954994 A     11/2020
(Continued)

OTHER PUBLICATIONS

CATT, Discussion on DC location reporting for intra-band UL CA, 3GPP TSG-RAN WG2 Meeting #112 electronic, R2-2009371, Online, Nov. 2020.
(Continued)

*Primary Examiner* — Charles T Shedrick
(74) *Attorney, Agent, or Firm* — Perilla Knox & Hildebrandt LLP; Kenneth A. Knox

(57) ABSTRACT

This application discloses a method for direct current location processing and a related device. The method includes: determining, by a terminal, first information; and sending, by the terminal, the first information to a network device; where the first information includes at least one of the following: first indication information, where the first indication information is used to indicate the number of power amplifiers included in the terminal or indicate whether the terminal includes at least two power amplifiers; the number of direct current location groups; second indication information, where the second indication information is used to indicate whether the terminal supports a capability of adjusting a direct current location; information about direct current location algorithm; a preset list, where the preset list includes at least one group of target objects corresponding to a direct current location group, the target object being a component carrier CC or band.

20 Claims, 5 Drawing Sheets

12

Network device

11

Terminal

(56) References Cited

U.S. PATENT DOCUMENTS

| | | | |
|---|---|---|---|
| 2022/0053492 A1 | 2/2022 | Deng et al. | |
| 2022/0070891 A1* | 3/2022 | Nam | H04L 27/2602 |
| 2022/0124666 A1* | 4/2022 | Vintola | H04L 27/2602 |
| 2023/0131328 A1* | 4/2023 | Zhang | H04L 5/0035 |
| | | | 370/329 |

FOREIGN PATENT DOCUMENTS

| | | | | |
|---|---|---|---|---|
| EP | 4195835 A1 * | 6/2023 | | H04L 5/001 |
| JP | 2022530157 A | 6/2022 | | |
| WO | 2016058444 A1 | 4/2016 | | |
| WO | 2019199814 A1 | 10/2019 | | |
| WO | 2020215922 A1 | 10/2020 | | |

OTHER PUBLICATIONS

Huawei, Hisilicon, On DC location for intra-band UL CA, 3GPP TSG-RAN4 WG4 Meeting # 97-e, R4-2016514, Electronic meeting, Nov. 2-13, 2020.

Nokia, Nokia Shanghai Bell, " More on DC location reporting for Intra band UL CA", 3GPP TSG-RAN WG4 Meeting #97-e, R4-2015212, Electronic Meeting, Nov. 2-13, 2020.

Qualcomm Incorporated, "DC location reporting for intra-band UL CA", 3GPP TSG-RAN WG2 Meeting #112-e, R2-2010171, Electronic, Nov. 2-13, 2020.

Qualcomm Incorporated, "LO location for intra-band UL CA", 3GPP TSG-RAN WG4 Meeting #96, R4-2010049, May 2020.

Huawei, Hisilicon, "WF on DC location reporting for intra-band UL CA", 3GPP TSG-RAN WG4 #97-e, R4-2016816, Nov. 2-13, 2020, Electronic meeting.

RAN4, "[Draft]LS on DC location reporting f or intra-band UL CA", 3GPP TSG-RAN WG4 Meeting # 97-e, R4-2016817, Electronic Meeting, Nov. 2-13, 2020.

3GPP TSG-RAN WG4 Meeting #97-e, "Email discussion summary for RAN4#96_#112_NR_RF_FR1_Part_1," Source: Huawei, HiSilicon, Document R4-2016956, Electronic Meeting, Nov. 2-13, 2020. Agenda item: 7.11.1.

1st Office Action for KR Patent Application No. 10-2023-7025360 of Aug. 19, 2025.

* cited by examiner

12

Network
device

11

Terminal

700

Communication device

701    Processor  ⟷  Memory    702

800

801 — Radio frequency unit

Network module — 802

810 —

Memory

809 — Application program

Operating system

Audio output unit — 803

804

Input unit

Graphics processing unit

Microphone

808 — Interface unit

Processor

807 —

User input unit

Touch panel

Other input devices

806

Display unit

Display panel

Sensor — 805

METHOD FOR DIRECT CURRENT LOCATION PROCESSING AND RELATED DEVICE

CROSS-REFERENCE TO RELATED APPLICATIONS

This application is a continuation application of PCT International Application No. PCT/CN2021/143668 filed on Dec. 31, 2021, which claims priority to Chinese Patent Application No. 202110020056.3, filed in China on Jan. 7, 2021, which are incorporated herein by reference in their entireties.

TECHNICAL FIELD

This application pertains to the field of communication technologies, and in particular relates to a method for direct current location processing and a related device.

BACKGROUND

In communication systems, in order to assist network devices in solving interference problems caused by carrier leakage, terminals can report direct current locations (DC location) to network devices. In the prior art, terminals directly report possible direct current locations in most cases. For example, for one component carrier (CC), multiple bandwidth parts (BWP) may be included, and a direct current location corresponding to any BWP group needs to be reported. Therefore, reported direct current location information usually includes CC information, BWP information, and direct current location, which will result in large signaling overheads for direct current location reporting.

SUMMARY

According to a first aspect, a method for direct current location processing is provided and includes:
determining, by a terminal, first information; and
sending, by the terminal, the first information to a network device; where
the first information is used for determining a direct current location of at least one bandwidth part BWP group, and the first information includes at least one of the following:
first indication information, where the first indication information is used to indicate the number of power amplifiers included in the terminal or indicate whether the terminal includes at least two power amplifiers;
the number of direct current location groups;
second indication information, where the second indication information is used to indicate whether the terminal supports a capability of adjusting a direct current location;
information about direct current location algorithm;
a preset list, where the preset list includes at least one group of target objects corresponding to a direct current location group, the target object being a component carrier CC or band; and
direct current location information, where the direct current location information includes an index identifier of a BWP group corresponding to a direct current location.

According to a second aspect, a method for direct current location processing is provided and includes:
receiving, by a network device, first information from a terminal; and
determining, by the network device, a direct current location of at least one bandwidth part BWP group based on the first information; where
the first information includes at least one of the following:
first indication information, where the first indication information is used to indicate the number of power amplifiers included in the terminal or indicate whether the terminal includes at least two power amplifiers;
the number of direct current location groups;
second indication information, where the second indication information is used to indicate whether the terminal supports a capability of adjusting a direct current location;
information about direct current location algorithm;
a preset list, where the preset list includes at least one group of target objects corresponding to a direct current location group, the target object being a component carrier CC or band; and
direct current location information, where the direct current location information includes an index identifier of a BWP group corresponding to a direct current location.

According to a third aspect, an apparatus for direct current location processing is provided and includes:
a first determining module configured for a terminal to determine first information; and
a sending module configured for the terminal to send the first information to a network device; where
the first information is used for determining a direct current location of at least one bandwidth part BWP group, and the first information includes at least one of the following:
first indication information, where the first indication information is used to indicate the number of power amplifiers included in the terminal or indicate whether the terminal includes at least two power amplifiers;
the number of direct current location groups;
second indication information, where the second indication information is used to indicate whether the terminal supports a capability of adjusting a direct current location;
information about direct current location algorithm;
a preset list, where the preset list includes at least one group of target objects corresponding to a direct current location group, the target object being a component carrier CC or band; and
direct current location information, where the direct current location information includes an index identifier of a BWP group corresponding to a direct current location.

According to a fourth aspect, an apparatus for direct current location processing is provided and includes:
a receiving module configured for a network device to receive first information from a terminal; and
a second determining module configured for the network device to determine a direct current location of at least one bandwidth part BWP group based on the first information; where
the first information includes at least one of the following:
first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and direct current location information, where the direct current location information includes an index identifier of a BWP group corresponding to a direct current location.

According to a fifth aspect, a terminal is provided. The terminal includes a processor, a memory, and a program or instructions stored in the memory and capable of running on the processor, and when the program or instructions are executed by the processor, the steps of the method according to the first aspect are implemented.

According to a sixth aspect, a network device is provided. The network device includes a processor, a memory, and a program or instructions stored in the memory and capable of running on the processor, and when the program or instructions are executed by the processor, the steps of the method according to the second aspect are implemented.

According to a seventh aspect, a readable storage medium is provided. The readable storage medium stores a program or instructions, and when the program or instructions are executed by a processor, the steps of the method according to the first aspect are implemented or the steps of the method according to the second aspect are implemented.

According to an eighth aspect, an embodiment of this application provides a chip. The chip includes a processor and a communication interface, the communication interface is coupled to the processor, and the processor is configured to run a program or instructions of a network device to implement the steps of the method according to the first aspect or the steps of the method according to the second aspect.

According to a ninth aspect, a computer program product is provided. The computer program product is stored in a non-volatile storage medium, and the computer program product is executed by at least one processor to implement the method according to the first aspect or the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, in this specification and claims, "and/or" indicates at least one of the connected objects, and the character "/" generally indicates an "or" relationship between the contextually associated objects.

It is worth noting that the technologies described in the embodiments of this application are not limited to long term evolution (LTE)/LTE-Advanced (LTE-A) systems, but may also be used in other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network device" in the embodiments of this application are often used interchangeably, and the technology described herein may be used in the above-mentioned systems and radio technologies as well as other systems and radio technologies. However, in the following descriptions, the new radio (NR) system is described for an illustration purpose, and NR terms are used in most of the following descriptions, although these technologies may also be used in applications other than the NR system, for example, the 6th generation (6G) communication system.

Figure 1:
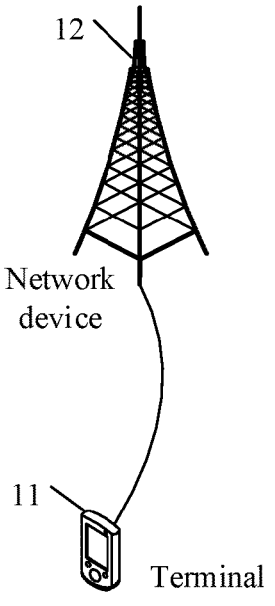
FIG. 1 is a structural diagram of a network system to which the embodiments of this application are applicable.

FIG. 1 is a block diagram of a wireless communication system to which an embodiment of this application may be applied. The wireless communication system includes a terminal 11 and a network device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, and the like. It should be noted that the terminal 11 is not limited to any particular type in the embodiments of this application. The network device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a wireless local area network (WLAN) access point, a wireless fidelity (WiFi) node, a transmission-reception point (TRP) or other appropriate terms in the art. Provided that the same technical effects are achieved, the base station is not limited to any particular technical terms. It should be noted that in the embodiments of this application, only the base station in the NR system is used as an example, but the base station is not limited in type.

Figure 2:
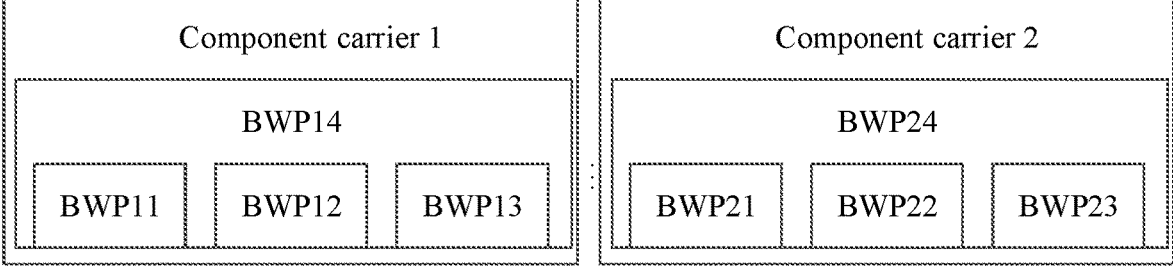
FIG. 2 is an example diagram of distribution of bandwidth parts in two component carriers in a method for direct current location processing provided in an embodiment of this application.

For ease of understanding, the following describes some content included in the embodiments of this application:

Generally, a terminal may support one power amplifier (Power Amplifier, PA) or two PAs. One PA can cover one or more CCs, and one CC covers multiple BWPs. One PA may have one direct current location. For example, in frequency range (FR) 1, on one CC, up to four BWPs can be configured, one of which spans the entire CC. As shown in FIG. 2, component carrier 1 is configured with bandwidth parts 11, 12, 13, and 14, bandwidth part 14 spanning component carrier 1, and component carrier 2 is configured with bandwidth parts 21, 22, 23, and 24, bandwidth part 24 spanning component carrier 2.

Optionally, a direct current location may be generally in the middle of an actually active or configured BWP or CC. A direct current location may vary with the location of actually active frequency of a terminal. The terminal may report direct current location information by cell and BWP and report it through a radio resource control (RRC) message.

The following describes in detail a method for direct current location processing provided in the embodiments of this application by using specific embodiments and application scenarios thereof with reference to the accompanying drawings.

Figure 3:
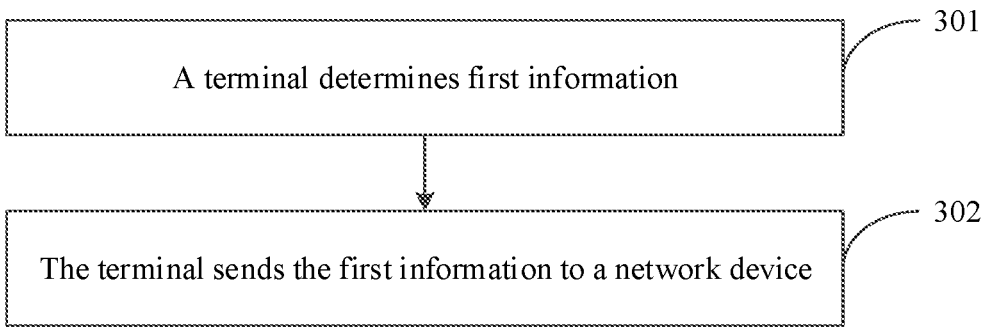
FIG. 3 is a flowchart of a method for direct current location processing provided in an embodiment of this application.

Refer to FIG. 3. FIG. 3 is a flowchart of a method for direct current location processing provided in an embodiment of this application. The method is executed by a terminal and as shown in FIG. 3, includes the following steps.

Step 301. The terminal determines first information.

Step 302. The terminal sends the first information to a network device.

The first information is used for determining a direct current location of at least one bandwidth part BWP group, and the first information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and direct current location information, where the direct current location information includes an index identifier of a BWP group corresponding to a direct current location.

In this embodiment of this application, the first indication information, the number of direct current location groups, and the second indication information may be understood as UE parameters used to assist the network device in determining the direct current location. It should be understood that the network device may use one or more of the UE parameters reported by the terminal, and other parameters (for example, algorithm for calculating direct current location) may be reported by the terminal in advance, or may be specified in a protocol, or may be carried in the first information. In this way, the network device can determine a current direct current location of the terminal based on the first information reported by the terminal.

The first indication information may directly indicate the number of PAs or indicate whether the number of PAs is at least two. For example, in a case that the first indication information indicates that the number of PAs is at least two, the network device may assume by default that the number of PAs of the terminal is a fixed preset value in this case, the fixed preset value being an integer greater than 1. In a case that the first indication information indicates that the number of PAs is not at least two, the network device may assume by default that the number of PAs of the terminal is one in this case.

It should be understood that the direct current location group may correspond to multiple pieces of possible direct current location information, and only one direct current location is effective for each direct current location group at a time. For example, when the terminal has multiple direct current locations, the multiple direct current locations correspond to different direct current location groups. Optionally, in some embodiments, the direct current location group may correspond to a PA. For example, one direct current location group corresponds to one PA. In other words, possible direct current locations of a PA are grouped into one direct current location group. In this embodiment of this application, the direct current location group includes one or more direct current locations, with one direct current location corresponding to one BWP group, that is, the direct current location is a direct current location corresponding to the BWP group.

Whether the terminal supports a capability of adjusting a direct current location can be understood as whether the terminal has a capability of adjusting a direct current location in real time based on an active BWP.

Reporting the information about direct current location algorithm by the terminal can be understood as implicitly reporting a direct current location by the terminal, and the network device can determine the direct current location of the terminal based on the information about direct current location algorithm reported by the terminal.

The preset list can be understood as a CC list or a band list. The preset list may include at least one group of CCs or at least one group of bands. Each group of CCs may correspond to one PA, and each group of bands may correspond to one PA. The preset list can assist the network device in determining the direct current location of the terminal as auxiliary information. In this embodiment of this application, the preset list can be understood as CC or band group information.

Optionally, the terminal reporting the direct current location information can be understood as explicitly indicating the direct current location information by the terminal, and the network device can analyze the direct current location information based on advanced reporting, or a UE parameter or CC and band group information reported by the terminal this time, so as to obtain the direct current location reported by the terminal.

In this embodiment of this application, the terminal determines the first information, and the terminal sends the first information to the network device. The first information is used for determining a direct current location of at least one bandwidth part BWP group. The first information includes at least one of the following: first indication information, where the first indication information is used to indicate the number of power amplifiers included in the terminal or indicate whether the terminal includes at least two power amplifiers; the number of direct current location groups; second indication information, where the second indication information is used to indicate whether the terminal supports a capability of adjusting a direct current location; information about direct current location algorithm; a preset list, where the preset list includes at least one group of target objects corresponding to a direct current location group, the target object being a component carrier CC or band; and direct current location information, where the direct current location information includes an index identifier of a BWP group corresponding to a direct current location. As a result, the terminal does not need to report CC information, BWP information, and direct current location for every possible direct current location, and the network device can determine the direct current location of the terminal based on the reported first information, thereby reducing the signaling overheads for direct current location reporting.

Optionally, in some embodiments, the information about direct current location algorithm is used to indicate at least one of the following:

determining a direct current location based on a first CC, where the first CC includes a CC with lowest frequency and a CC with highest frequency in configured CCs;

determining a direct current location based on a second CC;

determining a direct current location based on a first BWP, where the first BWP includes an active BWP in a second CC; and determining a direct current location based on a second BWP, where the second BWP includes a configured BWP in a second CC; where the second CC includes a CC with highest frequency and a CC with lowest frequency in active CCs.

In this embodiment of this application, the network device can calculate the direct current location of the terminal based on the information about direct current location algorithm reported by the terminal. The direct current location may include one or more direct current locations. This is not further limited herein.

Optionally, in some embodiments, the direct current location information further includes at least one of the following:

information about a BWP in which a direct current location is located; and third indication information, where the third indication information is used to indicate a direct current location in a BWP.

In this embodiment of this application, the method for constructing the direct current location information can be set depending on actual needs. For example, in some embodiments, the direct current location information satisfies any one of the following:

being determined based on a possible direct current location in a configured or active BWP; and being determined based on a direct current location within a BWP range of a BWP group.

The direct current location information being determined based on a possible direct current location in a configured or active BWP can be understood as the terminal constructing the direct current location information by PA or direct current location group, with the direct current location information including possible direct current locations that appear in the configured or active BWP, and an index identifier of a BWP group corresponding to a direct current location.

Optionally, in a case that the UE reports the direct current location by direct current location group, each direct current location group corresponds to one CC list including BWP groups within a corresponding CC. Each BWP group includes two BWPs. The terminal indicates the direct current location for each BWP group, and the direct current location includes the following information: information about a BWP in which a direct current location is located and a direct current location in a BWP. The information about a BWP in which a direct current location is located is information about BWPs in a BWP group.

The direct current location information being determined based on a direct current location within a BWP range of a BWP group can be understood as terminal reporting by BWP group. The direct current location is indexed to the BWP group. In this case, the terminal UE reports only a direct current location included within BWPs of the BWP group. In this embodiment, in a case that one direct current location corresponds to multiple BWP groups, only one direct current location and an index identifier of a BWP group associated with the direct current location may be reported, thereby reducing signaling overheads for direct current location reporting.

It should be noted that the direct current location may be indicated through a location in a CC or largest BWP. As shown in FIG. 2, the direct current location in a CC may be indicated as a location in BWP14.

Optionally, in some embodiments, the information about a BWP in which a direct current location is located is indicated by a Bool variable or bitmap. For example, 2-bit information can be used to identify which BWP in the BWP group the direct current location is in.

Optionally, in some embodiments, in a case that the third indication information indicates that a target BWP includes at least two direct current locations, the at least two direct current locations satisfy that:

a first direct current location is indicated by an absolute location or a first offset value, where the first offset value indicates an offset of the first direct current location relative to a start point of the target BWP; and a second direct current location is indicated by a second offset value, where the second offset value indicates an offset of the second direct current location relative to a previous adjacent direct current location; where the first direct current location is a direct current location closest to the start point of the target BWP in the at least two direct current locations, and the second direct current location is any one of direct current locations after the first direct current location.

It should be noted that in some embodiments, some direct current locations may be implicitly indicated by the information about direct current location algorithm, and some direct current locations may be explicitly indicated by CC or BWP.

Optionally, in some embodiments, the index identifier of the BWP group corresponding to the direct current location is arranged in a preset group order, and the preset group order is specified in a protocol or indicated by the network device.

For example, for component carrier 1 in FIG. 2, BWP11 and BWP12 are BWP group 1 corresponding to index identifier 001, BWP11 and BWP13 are BWP group 2 corresponding to index identifier 010, BWP11 and BWP14 are BWP group 3 corresponding to index identifier 011, BWP12 and BWP13 are BWP group 4 corresponding to index identifier 100, BWP12 and BWP14 are BWP group 5 corresponding to index identifier 101, and BWP13 and BWP14 are BWP group 6 corresponding to index identifier 110.

It should be noted that the reporting of the first information can be specified in a protocol or requested by the network device. In other words, the step of sending, by the terminal, first information to a network device includes:

sending, by the terminal, the first information to the network device according to protocol specification or a first report request from the network device.

In this embodiment of this application, the first report request is used to request the terminal to report at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and a band range for direct current location reporting.

It should be understood that in this embodiment of this application, in a case that the terminal reports the first information according to the first report request, the first information reported may be determined based on the first report request. For example, in a case that the first report request is used to request the terminal to report the first indication information, the first information may include the first indication information. Certainly, in other embodiments, in addition to the first indication information, other contents may also be reported, for example, the information about direct current location algorithm.

It should be noted that in this embodiment of this application, the first report request may include a supplementary uplink (SUL) report request.

Optionally, in some embodiments, before the step of determining, by a terminal, first information, the method further includes:

sending, by the terminal, second information to the network device according to protocol specification or a second report request from the network device; where the second information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band;

information about a BWP in which a direct current location is located;

third indication information, where the third indication information is used to indicate a direct current location in a BWP; and an index identifier of a BWP group corresponding to a direct current location in a BWP.

Optionally, in some embodiments, the first information is used for content addition, modification, or deletion for the second information. For example, in some embodiments, the second information is a UE parameter, that is, the terminal first reports the UE parameter or target-object group information and then reports CC or BWP information in direct current location information for a specific group, where the CC or BWP information may be identified with an intra-group sequence number. When the terminal reports the first information subsequently, the network device can analyze the first information based on the second information to determine the direct current location of the terminal. Such multiple reportings can reduce the signaling overheads as compared with a single reporting.

For better understanding of this application, the following describes an implementation process of this application in detail by using some embodiments.

Embodiment 1. Reporting of PA-CC/Band Mapping

The terminal reports a message. The message reported includes CC or band group information. Optionally, the message reported may be sent through RRC signaling, such as RRC setup complete (RRCSetupComplete) signaling, RRC reconfiguration complete (RRCReconfigurationComplete) signaling, or UE assistance information signaling.

For example, the terminal sends RRX signaling. The RRX signaling includes an uplink transmit direct current CC group list (UplinkTxDirectCurrentListCCgroups). The UplinkTxDirectCurrentListCCgroups includes multiple CClists, each CClist including at least one CC group. Optionally, UplinkTxDirectCurrentListCCgroups may be replaced with an uplink transmit direct current PA list, where one PA corresponds to one CC group.

Optionally, before reporting the message, the UE receives a request message 1 from the network device. The request message 1 requests the UE to report CC or band group information. Each CC or band group corresponds to one PA.

Further, the UE receives a request message 2 from the network device. The request message 2 requests the UE to report the direct current location information. The UE reports the direct current location information. The direct current location information includes at least one of the following:

information about a BWP in which a direct current location is located;

a direct current location in a BWP; and at least one BWP group corresponding to a direct current location.

Embodiment 2. Compressed Reporting of Direct
Current Location Information, in which a Direct
Current Location is Indexed to a BWP Group 1. The UE receives a direct current location report request
from the network device.
2. The UE reports the direct current location information.
The UE constructs the direct current location information.
The UE first constructs the direct current location informa-
tion by PA or direct current location group.

Each piece of direct current location information includes:
information about a BWP in which a direct current
location is located, where the BWP may be a BWP
possibly having a direct current location within a BWP
range of a configured or active BWP;
a direct current location in a BWP; and
an index identifier of at least one BWP group correspond-
ing to a direct current location.

Optionally, the index identifier of the BWP group includes
a BWP group ID with a default group order. The default
BWP group order is specified in a protocol.

For example, in direct current location reporting via
UplinkTxDirectCurrentListCCgroups, the UplinkTxDirect-
CurrentListCCgroups includes multiple CClists in this case.
Each CClist includes at least one CC group.

Each CC group includes at least one txDirectCurrentLo-
cationInfo (that is, the direct current location information).

Each txDirectCurrentLocationInfo includes:
a direct current location txDirectCurrentLocation;
a BWP in which a direct current location is located
(ServCellIndex); and
at least one BWP group.

Optionally, the BWP group may be an index identifier of
a BWP group, and the index identifier of a BWP group is
arranged in a default group order. The default BWP group
order may be specified in a protocol.

Optionally, in a case that multiple direct current locations
are reported for one BWP, the direct current location may be
expressed in absolute value or offset. In a case of offset
expression, the first location is either an absolute location or
an offset relative to a start point of the BWP, and subsequent
locations are all offset locations relative to a previous one.

Embodiment 3. Reporting Only Possible Direct
Current Location Information Using Default BWP
Group Index 1. The UE receives a direct current location report request
from the network device.
2. The UE reports the direct current location information.
Optionally, a method for constructing the direct current
location information is that the UE first constructs the direct
current location information by PA or DC location group.

Each piece of direct current location information includes
at least one of the following:
BWP group information; an index identifier of a BWP
group, where the index identifier of a BWP group is
arranged in a default group order, and the default group
order of BWP groups can be specified in a protocol; and
an indication of a BWP in which a direct current location
is located, where optionally, a Bool variable (bool
BWP) or bitmap (for example, 2 bits) is used to indicate
which BWP the direct current location is in.

Optionally, Bool BWP indication=TRUE indicates that
the BWP is BWP1 in the BWP group <BWP1, BWP2>; and
Bool BWP indication=FALSE indicates that the BWP is
BWP2 in the BWP group <BWP1, BWP2>.

Optionally, a bitmap (for example, 2 bits) is used for
indication. For example:
01 indicates that the BWP is BWP1 in the BWP group
<BWP1, BWP2>; and
10 indicates that the BWP is BWP2 in the BWP group
<BWP1, BWP2>.

Embodiment 4. Implicit Reporting Based on UE
Parameters and Algorithm Information 1. The UE receives a direct current location report request
from the network device. The direct current location
report request includes at least one of:
reporting the number of PAs or reporting whether multiple
PAs are used,
reporting whether a tuning capability is supported, where
the tuning capability is a capability of adjusting the
direct current location by the UE in real time based on
an active BWP, and
information about direct current location algorithm.
2. The UE sends a message to report the direct current
location information, where the direct current location
information includes at least one of the following:
UE parameters reported by the UE, including the number
of PAs, the number of DC location groups, a tuning
capability, and the like;
two or more pieces of CC or band group information
reported by the UE, where each CC or band group
corresponds to one PA; and
information about direct current location algorithm,
where the information about direct current location
algorithm may be specified in a protocol, and the
information about direct current location algorithm
indicates a method or factor used by the UE to calculate
the direct current location and includes at least one of
the following:
determining a direct current location based on a first CC,
where the first CC includes a CC with lowest frequency
and a CC with highest frequency in configured CCs;
determining a direct current location based on a second
CC;
determining a direct current location based on a first BWP,
where the first BWP includes an active BWP in a
second CC; and
determining a direct current location based on a second
BWP, where the second BWP includes a configured
BWP in a second CC; where
the second CC includes a CC with highest frequency and
a CC with lowest frequency in active CCs.
3. The network device receives a direct current location
report of the UE.

The network device calculates the direct current location
of the UE based on the information about direct current
location algorithm reported by the UE and uplink carrier
aggregation (CA) configuration information.

Figure 4:
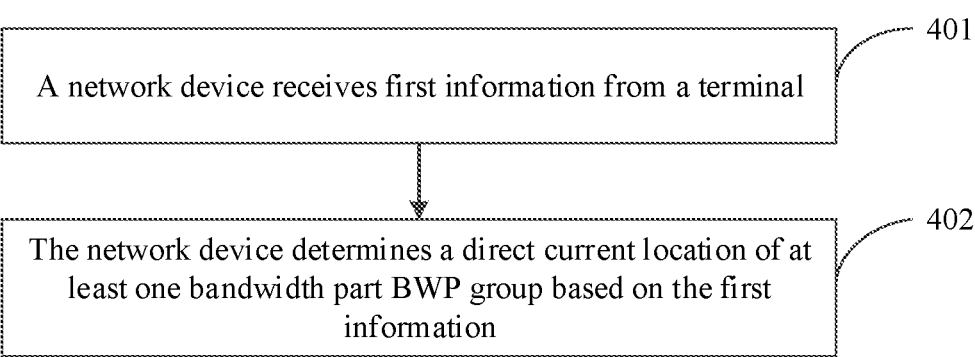
FIG. 4 is a flowchart of another method for direct current location processing provided in an embodiment of this application.

Refer to FIG. 4. FIG. 4 is a flowchart of another method
for direct current location processing provided in an embodi-
ment of this application. The method is executed by a
network device, and as shown in FIG. 4, includes the
following steps.

Step 401. The network device receives first information
from a terminal.

Step 402. The network device determines a direct current location of at least one bandwidth part BWP group based on the first information.

the first information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and direct current location information, where the direct current location information includes an index identifier of a BWP group corresponding to a direct current location.

Optionally, the information about direct current location algorithm is used to indicate at least one of the following:

determining a direct current location based on a first CC, where the first CC includes a CC with lowest frequency and a CC with highest frequency in configured CCs;

determining a direct current location based on a second CC;

determining a direct current location based on a first BWP, where the first BWP includes an active BWP in a second CC; and determining a direct current location based on a second BWP, where the second BWP includes a configured BWP in a second CC; where the second CC includes a CC with highest frequency and a CC with lowest frequency in active CCs.

Optionally, the direct current location information further includes at least one of the following:

information about a BWP in which a direct current location is located; and third indication information, where the third indication information is used to indicate a direct current location in a BWP.

Optionally, the direct current location information satisfies any one of the following:

being determined based on a possible direct current location in a configured or active BWP; and being determined based on a direct current location within a BWP range of a BWP group.

Optionally, the information about a BWP in which a direct current location is located is indicated by a Bool variable or bitmap.

Optionally, in a case that the third indication information indicates that a target BWP includes at least two direct current locations, the at least two direct current locations satisfy that:

a first direct current location is indicated by an absolute location or a first offset value, where the first offset value indicates an offset of the first direct current location relative to a start point of the target BWP; and a second direct current location is indicated by a second offset value, where the second offset value indicates an offset of the second direct current location relative to a previous adjacent direct current location; where the first direct current location is a direct current location closest to the start point of the target BWP in the at least two direct current locations, and the second direct current location is any one of direct current locations after the first direct current location.

Optionally, the index identifier of the BWP group corresponding to the direct current location is arranged in a preset group order, and the preset group order is specified in a protocol or indicated by the network device.

Optionally, before the step of receiving, by a network device, first information from a terminal, the method further includes:

sending, by the network device, a first report request to the terminal, where the first report request is used to request the terminal to send the first information to the network device.

Optionally, the first report request is used to request the terminal to report at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and a band range for direct current location reporting.

Optionally, the first report request includes a supplementary uplink report request.

Optionally, before the step of receiving, by a network device, first information from a terminal, the method further includes:

receiving, by the network device, second information from the terminal; where the second information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band;

information about a BWP in which a direct current location is located;

third indication information, where the third indication information is used to indicate a direct current location in a BWP; and an index identifier of a BWP group corresponding to a direct current location in a BWP.

Optionally, the first information is used for content addition, modification, or deletion for the second information.

It should be noted that this embodiment serves as an implementation of the network device corresponding to the embodiment shown in FIG. 3. For specific implementations of this embodiment, reference may be made to related description of the embodiment shown in FIG. 3, with the same effects achieved. To avoid repetition, details are not described herein again.

It should be noted that the method for direct current location processing provided in the embodiments of this application, the execution body may be an apparatus for direct current location processing or a control module for executing the method for direct current location processing in the apparatus for direct current location processing. In the embodiments of this application, the apparatus for direct current location processing provided by the embodiments of this application is described by using the method for direct current location processing being executed by the apparatus for direct current location processing as an example.

Figure 5:
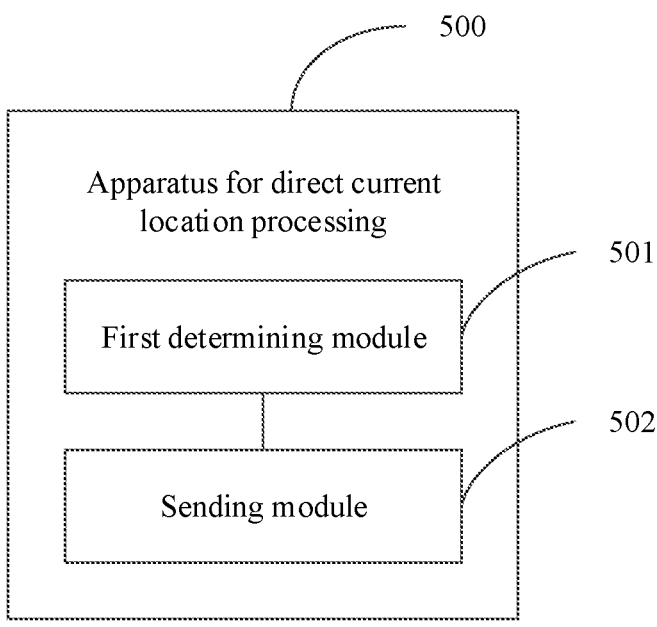
FIG. 5 is a structural diagram of an apparatus for direct current location processing provided in an embodiment of this application.

Refer to FIG. 5. FIG. 5 is a structural diagram of an apparatus for direct current location processing provided in an embodiment of this application. As shown in FIG. 5, the apparatus for direct current location processing 500 includes:

a first determining module 501 configured for a terminal to determine first information; and a sending module 502 configured for the terminal to send the first information to a network device; where the first information is used for determining a direct current location of at least one bandwidth part BWP group, and the first information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and direct current location information, where the direct current location information includes an index identifier of a BWP group corresponding to a direct current location.

Optionally, the information about direct current location algorithm is used to indicate at least one of the following:

determining a direct current location based on a first CC, where the first CC includes a CC with lowest frequency and a CC with highest frequency in configured CCs;

determining a direct current location based on a second CC;

determining a direct current location based on a first BWP, where the first BWP includes an active BWP in a second CC; and determining a direct current location based on a second BWP, where the second BWP includes a configured BWP in a second CC; where the second CC includes a CC with highest frequency and a CC with lowest frequency in active CCs.

Optionally, the direct current location information further includes at least one of the following:

information about a BWP in which a direct current location is located; and third indication information, where the third indication information is used to indicate a direct current location in a BWP.

Optionally, the direct current location information satisfies any one of the following:

being determined based on a possible direct current location in a configured or active BWP; and being determined based on a direct current location within a BWP range of a BWP group.

Optionally, the information about a BWP in which a direct current location is located is indicated by a Bool variable or bitmap.

Optionally, in a case that the third indication information indicates that a target BWP includes at least two direct current locations, the at least two direct current locations satisfy that:

a first direct current location is indicated by an absolute location or a first offset value, where the first offset value indicates an offset of the first direct current location relative to a start point of the target BWP; and a second direct current location is indicated by a second offset value, where the second offset value indicates an offset of the second direct current location relative to a previous adjacent direct current location; where the first direct current location is a direct current location closest to the start point of the target BWP in the at least two direct current locations, and the second direct current location is any one of direct current locations after the first direct current location.

Optionally, the index identifier of the BWP group corresponding to the direct current location is arranged in a preset group order, and the preset group order is specified in a protocol or indicated by the network device.

Optionally, the sending module 502 is further configured for the terminal to send the first information to the network device according to protocol specification or a first report request from the network device.

Optionally, the first report request is used to request the terminal to report at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and a band range for direct current location reporting.

Optionally, the first report request includes a supplementary uplink report request.

Optionally, before the step of determining, by a terminal, first information, the method further includes:

sending, by the terminal, second information to the network device according to protocol specification or a second report request from the network device; where the second information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band;

information about a BWP in which a direct current location is located;

third indication information, where the third indication information is used to indicate a direct current location in a BWP; and an index identifier of a BWP group corresponding to a direct current location in a BWP.

Optionally, the first information is used for content addition, modification, or deletion for the second information.

The apparatus for direct current location processing provided in this embodiment of this application is capable of implementing processes implemented by the terminal in the method embodiment of FIG. 3. To avoid repetition, details are not described herein again.

Figure 6:
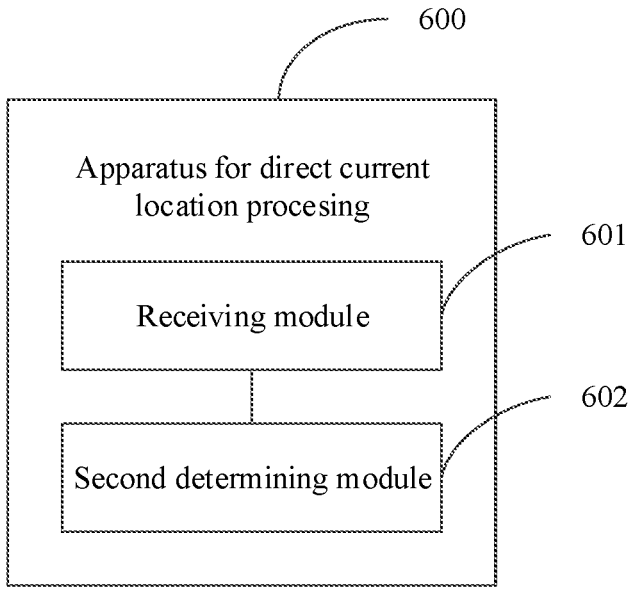
FIG. 6 is a structural diagram of another apparatus for direct current location processing provided in an embodiment of this application.

Refer to FIG. 6. FIG. 6 is a structural diagram of another apparatus for direct current location processing provided in an embodiment of this application. As shown in FIG. 6, the apparatus for direct current location processing 600 includes:

a receiving module 601 configured for a network device to receive first information from a terminal; and a second determining module 602 configured to determine a direct current location of at least one bandwidth part BWP group based on the first information; where the first information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and direct current location information, where the direct current location information includes an index identifier of a BWP group corresponding to a direct current location.

Optionally, the information about direct current location algorithm is used to indicate at least one of the following:

determining a direct current location based on a first CC, where the first CC includes a CC with lowest frequency and a CC with highest frequency in configured CCs;

determining a direct current location based on a second CC;

determining a direct current location based on a first BWP, where the first BWP includes an active BWP in a second CC; and determining a direct current location based on a second BWP, where the second BWP includes a configured BWP in a second CC; where the second CC includes a CC with highest frequency and a CC with lowest frequency in active CCs.

Optionally, the direct current location information further includes at least one of the following:

information about a BWP in which a direct current location is located; and third indication information, where the third indication information is used to indicate a direct current location in a BWP.

Optionally, the direct current location information satisfies any one of the following:

being determined based on a possible direct current location in a configured or active BWP; and being determined based on a direct current location within a BWP range of a BWP group.

Optionally, the information about a BWP in which a direct current location is located is indicated by a Bool variable or bitmap.

Optionally, in a case that the third indication information indicates that a target BWP includes at least two direct current locations, the at least two direct current locations satisfy that:

a first direct current location is indicated by an absolute location or a first offset value, where the first offset value indicates an offset of the first direct current location relative to a start point of the target BWP; and a second direct current location is indicated by a second offset value, where the second offset value indicates an offset of the second direct current location relative to a previous adjacent direct current location; where the first direct current location is a direct current location closest to the start point of the target BWP in the at least two direct current locations, and the second direct current location is any one of direct current locations after the first direct current location.

Optionally, the index identifier of the BWP group corresponding to the direct current location is arranged in a preset group order, and the preset group order is specified in a protocol or indicated by the network device.

Optionally, the apparatus for direct current location processing 600 further includes a sending module, configured for the network device to send a first report request to the terminal, where the first report request is used to request the terminal to send the first information to the network device.

Optionally, the first report request is used to request the terminal to report at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and a band range for direct current location reporting.

Optionally, the first report request includes a supplementary uplink report request.

Optionally, before the step of receiving, by a network device, first information from a terminal, the method further includes:

receiving, by the network device, second information from the terminal, where the first information is used for content addition, modification, or deletion for the second information.

Optionally, the second information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band;

information about a BWP in which a direct current location is located;

third indication information, where the third indication information is used to indicate a direct current location in a BWP; and an index identifier of a BWP group corresponding to a direct current location in a BWP.

Optionally, the first information is used for content addition, modification, or deletion for the second information.

The apparatus for direct current location processing provided in this embodiment of this application is capable of implementing processes by the network device in the method embodiment of FIG. 4. To avoid repetition, details are not described herein again.

The apparatus for direct current location processing in this embodiment of this application may be an apparatus or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which are not specifically limited in the embodiments of this application.

The apparatus for direct current location processing in this embodiment of this application may be an apparatus having an operating system. The operating system may be an android (Android) operating system, an iOS operating system, or other possible operating systems. This is not specifically limited in the embodiments of this application.

The apparatus for direct current location processing provided in this embodiment of this application is capable of implementing the processes implemented in the method embodiments in FIG. 3 and FIG. 4, with the same technical effects achieved. To avoid repetition, details are not described herein again.

Figures 7, 8:
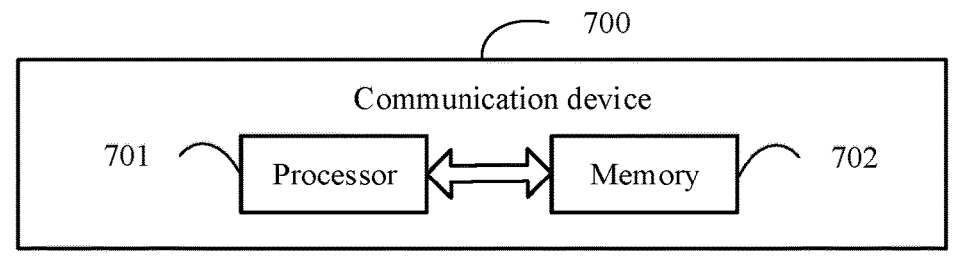
FIG. 7 is a structural diagram of a communication device provided in an embodiment of this application.
FIG. 8 is a structural diagram of a terminal provided in an embodiment of this application.

Optionally, as shown in FIG. 7, an embodiment of this application further provides a communication device 700 including a processor 701, a memory 702, and a program or instructions stored in the memory 702 and capable of running on the processor 701. When the program or instructions are executed by the processor 701, the processes of the foregoing embodiment of the method for direct current location processing are implemented, with the same technical effects achieved. To avoid repetition, details are not described herein again.

FIG. 8 is a schematic diagram of a hardware structure of a terminal for implementing the embodiments of this application.

The terminal 800 includes but is not limited to components such as a radio frequency unit 801, a network device module 802, an audio output unit 803, an input unit 804, a sensor 805, a display unit 806, a user input unit 807, an interface unit 808, a memory 809, and a processor 810.

It can be understood by those skilled in the art that the terminal 800 may further include a power supply (for example, a battery) supplying power to the components. The power supply may be logically connected to the processor 810 via a power management system, so that functions such as charge management, discharge management, and power consumption management are implemented by using the power management system. The structure of the terminal shown in FIG. 8 does not constitute any limitation on the terminal, and the terminal may include more or fewer components than shown in the figure, or combine some of the components, or have different arrangements of the components. Details are not described herein.

It should be understood that in this embodiment of this application, the input unit 804 may include a graphics processing unit (GPU) 8041 and a microphone 8042. The graphics processing unit 8041 processes image data of a static picture or a video that is obtained by an image capture apparatus (for example, a camera) in an image capture mode or a video capture mode. The display unit 806 may include a display panel 8061. The display panel 8061 may be configured in a form of a liquid crystal display, an organic light-emitting diode display, or the like. The user input unit 807 includes a touch panel 8071 and other input devices 8072. The touch panel 8071 is also referred to as a touch-screen. The touch panel 8071 may include two parts: a touch detection apparatus and a touch controller. The other input devices 8072 may include but are not limited to a physical keyboard, a functional button (such as a volume control button or a power on/off button), a trackball, a mouse, and a joystick. Details are not described herein.

In this embodiment of this application, the radio frequency unit 801 transmits downlink data received from a network device to the processor 810 for processing, and in addition, transmits uplink data to the network device. Generally, the radio frequency unit 801 includes but is not limited to an antenna, at least one amplifier, a transceiver, a coupler, a low noise amplifier, a duplexer, and the like.

The memory 809 may be configured to store software programs or instructions and various data. The memory 809 may include a program or instruction storage area and a data storage area. The program or instruction storage area may store an operating system, an application program or instructions required by at least one function (for example, sound play function or image play function), and the like. In addition, the memory 809 may include a high-speed random access memory, and may further include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, flash memory device, or other volatile solid-state storage device.

The processor 810 may include one or more processing units. Optionally, the processor 810 may integrate an application processor and a modem processor. The application processor mainly processes an operating system, a user interface, application programs or instructions, and the like. The modem processor mainly processes wireless communication, for example, being a baseband processor. It can be understood that the modem processor may alternatively be not integrated in the processor 810.

The processor 810 is configured for a terminal to determine first information.

The radio frequency unit 801 is configured for the terminal to send the first information to a network device.

The first information is used for determining a direct current location of at least one bandwidth part BWP group, and the first information includes at least one of the following:

first indication information, where the first indication information is used to indicate the number of power amplifiers included in the terminal or indicate whether the terminal includes at least two power amplifiers;

the number of direct current location groups;

second indication information, where the second indication information is used to indicate whether the terminal supports a capability of adjusting a direct current location;

information about direct current location algorithm;

a preset list, where the preset list includes at least one group of target objects corresponding to a direct current location group, the target object being a component carrier CC or band; and direct current location information, where the direct current location information includes an index identifier of a BWP group corresponding to a direct current location.

It should be understood that in this embodiment, the processor 810 and the radio frequency unit 801 is capable of implementing the processes implemented by the terminal in the method embodiment in FIG. 3. To avoid repetition, details are not described herein again.

Figure 9:
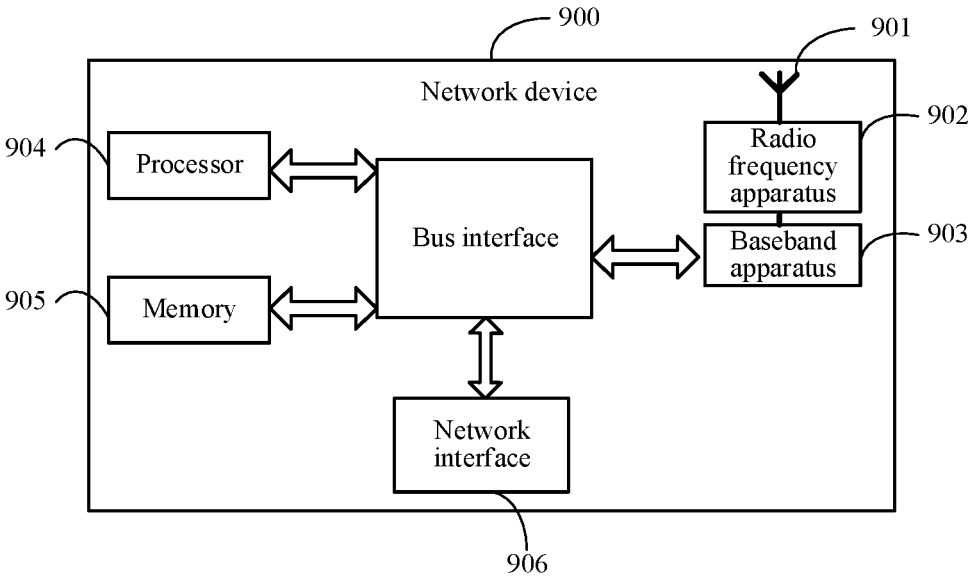
FIG. 9 is a structural diagram of a network device provided in an embodiment of this application.

Specifically, an embodiment of this application further provides a network device. As shown in FIG. 9, the network device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and transmits the received information to the baseband apparatus 903 for processing. In a downlink direction, the baseband apparatus 903 processes to-be-transmitted information, and transmits the information to the radio frequency apparatus 902; and the radio frequency apparatus 902 processes the received information and then transmits the information by using the antenna 901.

The frequency band processing apparatus may be located in the baseband apparatus 903. The method performed by the network device in the foregoing embodiment may be implemented by the baseband apparatus 903, and the baseband apparatus 903 includes a processor 904 and a memory 905.

The baseband apparatus 903 may include, for example, at least one baseband processing unit, where a plurality of chips are disposed on the baseband processing unit. As shown in FIG. 9, one of the chips is, for example, the processor 904, and connected to the memory 905, to invoke the program in the memory 905 to perform the operations of the network device shown in the foregoing method embodiment.

The baseband apparatus 903 may further include a network device interface 906 configured to exchange information with the radio frequency apparatus 902, where the interface is, for example, a common public radio interface (CPRI).

Specifically, the network device in this embodiment of this application further includes instructions or a program stored in the memory 905 and capable of running on the processor 904. The processor 904 invokes the instructions or program in the memory 905 to perform the method performed by the modules shown in FIG. 6, with the same technical effects achieved. To avoid repetition, details are not described herein again.

An embodiment of this application further provides a readable storage medium, where a program or instructions are stored in the readable storage medium. When the program or instructions are executed by a processor, the processes of the foregoing embodiment of the method for direct current location processing can be implemented, with the same technical effects achieved. To avoid repetition, details are not described herein again.

The processor is a processor in the electronic device described in the foregoing embodiment. The readable storage medium includes a computer-readable storage medium, such as a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions of a network device to implement the processes of the foregoing embodiment of the method for direct current location processing, with the same technical effects achieved. To avoid repetition, details are not described herein again.

It should be understood that the chip in the embodiments of this application may also be referred to as a system-level chip, a system chip, a chip system, a system on chip, or the like.

An embodiment of this application provides a computer program product, where the computer program product is stored in a non-volatile storage medium, and when being executed by at least one processor, the computer program product is configured to implement the processes of the foregoing embodiment of the method for direct current location processing, with the same technical effects achieved. To avoid repetition, details are not described herein again.

It should be noted that the terms "include", "include", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

From the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred embodiment. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of this application.

The foregoing describes the embodiments of this application with reference to the accompanying drawings. However, this application is not limited to the foregoing specific embodiments. These specific embodiments are merely illustrative rather than restrictive. Inspired by this application, persons of ordinary skill in the art may develop many other forms without departing from the essence of this application and the protection scope of the claims, and all such forms shall fall within the protection scope of this application.

The invention claimed is:

1. A method for direct current location processing, comprising:

determining, by a terminal, first information; and sending, by the terminal, the first information to a network device; wherein the first information is used for determining a direct current location of at least one bandwidth part BWP group, and the first information comprises:

information about direct current location algorithm, wherein the information about direct current location algorithm is used to indicate at least one of the following:

determining a direct current location based on a first component carrier CC, wherein the first CC comprises a CC with lowest frequency and a CC with highest frequency in configured CCs;

determining a direct current location based on a second CC:

determining a direct current location based on a first BWP, wherein the first BWP comprises an active BWP in a second CC; and determining a direct current location based on a second BWP, wherein the second BWP comprises a configured BWP in a second CC; wherein the second CC comprises a CC with highest frequency and a CC with lowest frequency in active CCs.

2. The method according to claim 1, wherein the step of sending, by the terminal, the first information to a network device comprises: sending, by the terminal, the first information to the network device according to protocol specification or a first report request from the network device.

3. The method according to claim 2, wherein the first report request is used to request the terminal to report at least one of the following:

first indication information, wherein the first indication information is used to indicate the number of power amplifiers comprised in the terminal or indicate whether the terminal comprises at least two power amplifiers;

the number of direct current location groups;

second indication information, wherein the second indication information is used to indicate whether the terminal supports a capability of adjusting a direct current location;

information about direct current location algorithm;

a preset list, wherein the preset list comprises at least one group of target objects corresponding to a direct current location group, the target object being a component carrier CC or band; and a band range for direct current location reporting.

4. The method according to claim 2, wherein the first report request comprises a supplementary uplink report request.

5. The method according to claim 1, wherein before the step of determining, by a terminal, first information, the method further comprises:

sending, by the terminal, second information to the network device according to protocol specification or a second report request from the network device; wherein the second information comprises at least one of the following:

first indication information, wherein the first indication information is used to indicate the number of power amplifiers comprised in the terminal or indicate whether the terminal comprises at least two power amplifiers;

the number of direct current location groups;

second indication information, wherein the second indication information is used to indicate whether the terminal supports a capability of adjusting a direct current location;

information about direct current location algorithm;

a preset list, wherein the preset list comprises at least one group of target objects corresponding to a direct current location group, the target object being a component carrier CC or band;

information about a BWP in which a direct current location is located;

third indication information, wherein the third indication information is used to indicate a direct current location in a BWP; and an index identifier of a BWP group corresponding to a direct current location in a BWP.

6. The method according to claim 1, wherein the first information further comprises at least one of the following:

first indication information, wherein the first indication information is used to indicate the number of power amplifiers comprised in the terminal or indicate whether the terminal comprises at least two power amplifiers;

the number of direct current location groups;

second indication information, wherein the second indication information is used to indicate whether the terminal supports a capability of adjusting a direct current location;

a preset list, wherein the preset list comprises at least one group of target objects corresponding to a direct current location group, the target object being a CC or band; and direct current location information, wherein the direct current location information comprises an index identifier of a BWP group corresponding to a direct current location.

7. The method according to claim 6, wherein the direct current location information further comprises at least one of the following:

information about a BWP in which a direct current location is located; and third indication information, wherein the third indication information is used to indicate a direct current location in a BWP.

8. The method according to claim 7, wherein the direct current location information satisfies any one of the following:

being determined based on a possible direct current location in a configured or active BWP; and being determined based on a direct current location within a BWP range of a BWP group.

9. The method according to claim 7, wherein the information about a BWP in which a direct current location is located is indicated by a Bool variable or bitmap.

10. The method according to claim 7, wherein in a case that the third indication information indicates that a target BWP comprises at least two direct current locations, the at least two direct current locations satisfy that:

a first direct current location is indicated by an absolute location or a first offset value, wherein the first offset value indicates an offset of the first direct current location relative to a start point of the target BWP; and a second direct current location is indicated by a second offset value, wherein the second offset value indicates an offset of the second direct current location relative to a previous adjacent direct current location; wherein the first direct current location is a direct current location closest to the start point of the target BWP in the at least two direct current locations, and the second direct current location is any one of direct current locations after the first direct current location.

11. The method according to claim 6, wherein the index identifier of the BWP group corresponding to the direct current location is arranged in a preset group order, and the preset group order is specified in a protocol or indicated by the network device.

12. A method for direct current location processing, comprising:

receiving, by a network device, first information from a terminal; and determining, by the network device, a direct current location of at least one bandwidth part BWP group based on the first information; wherein the first information comprises:

information about direct current location algorithm, wherein the information about direct current location algorithm is used to indicate at least one of the following:

determining a direct current location based on a first component carrier CC, wherein the first CC comprises a CC with lowest frequency and a CC with highest frequency in configured CCs;

determining a direct current location based on a second CC:

determining a direct current location based on a first BWP, wherein the first BWP comprises an active BWP in a second CC; and determining a direct current location based on a second BWP, wherein the second BWP comprises a configured BWP in a second CC; wherein the second CC comprises a CC with highest frequency and a CC with lowest frequency in active CCs.

13. The method according to claim 12, wherein before the step of receiving, by a network device, first information from a terminal, the method further comprises:

sending, by the network device, a first report request to the terminal, wherein the first report request is used to request the terminal to send the first information to the network device.

14. The method according to claim 13, wherein the first report request is used to request the terminal to report at least one of the following:

first indication information, wherein the first indication information is used to indicate the number of power amplifiers comprised in the terminal or indicate whether the terminal comprises at least two power amplifiers;

the number of direct current location groups;

second indication information, wherein the second indication information is used to indicate whether the terminal supports a capability of adjusting a direct current location;

information about direct current location algorithm;

a preset list, wherein the preset list comprises at least one group of target objects corresponding to a direct current location group, the target object being a component carrier CC or band; and a band range for direct current location reporting, wherein the first report request comprises a supplementary uplink report request.

15. The method according to claim 14, wherein the direct current location information further comprises at least one of the following:

information about a BWP in which a direct current location is located; and third indication information, wherein the third indication information is used to indicate a direct current location in a BWP.

16. The method according to claim 15, wherein the direct current location information satisfies any one of the following:

being determined based on a possible direct current location in a configured or active BWP; and being determined based on a direct current location within a BWP range of a BWP group; or wherein the information about a BWP in which a direct current location is located is indicated by a Bool variable or bitmap; or wherein in a case that the third indication information indicates that a target BWP comprises at least two direct current locations, the at least two direct current locations satisfy that:

a first direct current location is indicated by an absolute location or a first offset value, wherein the first offset value indicates an offset of the first direct current location relative to a start point of the target BWP; and a second direct current location is indicated by a second offset value, wherein the second offset value indicates an offset of the second direct current location relative to a previous adjacent direct current location; wherein the first direct current location is a direct current location closest to the start point of the target BWP in the at least two direct current locations, and the second direct current location is any one of direct current locations after the first direct current location.

17. The method according to claim 14, wherein the index identifier of the BWP group corresponding to the direct current location is arranged in a preset group order, and the preset group order is specified in a protocol or indicated by the network device.

18. A terminal, comprising:

at least one hardware processor and memory storing program instructions executable by the at least one hardware processor that, when executed by the at least one hardware processor, direct the at least one hardware processor to perform:

determining first information; and sending the first information to a network device; wherein the first information is used for determining a direct current location of at least one bandwidth part BWP group, and the first information comprises:

information about direct current location algorithm, wherein the information about direct current location algorithm is used to indicate at least one of the following:

determining a direct current location based on a first component carrier CC, wherein the first CC comprises a CC with lowest frequency and a CC with highest frequency in configured CCs;

determining a direct current location based on a second CC;

determining a direct current location based on a first BWP, wherein the first BWP comprises an active BWP in a second CC; and determining a direct current location based on a second BWP, wherein the second BWP comprises a configured BWP in a second CC; wherein the second CC comprises a CC with highest frequency and a CC with lowest frequency in active CCs.

19. The terminal according to claim 18, wherein the step of sending the first information to a network device comprises: sending the first information to the network device according to protocol specification or a first report request from the network device.

20. The terminal according to claim 19, wherein the first report request is used to request the terminal to report at least one of the following:

first indication information, wherein the first indication information is used to indicate the number of power amplifiers comprised in the terminal or indicate whether the terminal comprises at least two power amplifiers;

the number of direct current location groups;

second indication information, wherein the second indication information is used to indicate whether the terminal supports a capability of adjusting a direct current location;

information about direct current location algorithm;

a preset list, wherein the preset list comprises at least one group of target objects corresponding to a direct current location group, the target object being a component carrier CC or band; and a band range for direct current location reporting.

* * * * *